United States Patent [19]
Ashok

[11] Patent Number: 5,742,103
[45] Date of Patent: Apr. 21, 1998

[54] EXTERNAL LINE HARMONICS REDUCTION MODULE FOR POWER SUPPLIES

[75] Inventor: Gerard Ashok, Austin, Tex.

[73] Assignee: Dell U.S.A., L.P., Austin, Tex.

[21] Appl. No.: 908,885

[22] Filed: Aug. 8, 1997

Related U.S. Application Data

[63] Continuation of Ser. No. 549,040, Oct. 27, 1995, abandoned.
[51] Int. Cl.$^6$ .................................................. H02J 3/01
[52] U.S. Cl. .................................... 307/105; 363/39
[58] Field of Search ............................. 307/105, 89–91; 333/167, 172, 175, 176, 185; 363/39, 40, 44, 47, 48, 144, 143; 361/118; 323/208; 439/502

[56] References Cited

U.S. PATENT DOCUMENTS

| | | | |
|---|---|---|---|
| 4,630,163 | 12/1986 | Cooper et al. | 361/118 |
| 5,001,620 | 3/1991 | Smith | 363/72 |
| 5,181,000 | 1/1993 | Smith | 333/185 |
| 5,349,284 | 9/1994 | Whittle | 323/207 |
| 5,434,740 | 7/1995 | Chan | 361/118 |
| 5,532,917 | 7/1996 | Hung | 323/208 |

FOREIGN PATENT DOCUMENTS 0352983  7/1989  European Pat. Off. .

OTHER PUBLICATIONS

Andreycak, Bill, "Active Power Factor Correction Using Zero Current and Zero Voltage Switching Techniques" Jun. 1991 HFPC Conference Proceedings.

Andreycak, Bill, "Power Factor Correction Using the UC3852 Controlled On–Time Zero Current Switching Technique", 1993–94 Unitrode Product & Applications Handbook, pp. 9–328 –9–343.

Andreycak, Bill, "Power Factor Correction Using the UC3852 Controlled On–Time Zero Current Switching Technique", 1995 estimated publication date.

Power Factor Correction Using The UC3852 Controlled On–Time Zero Current Switching Technique, By: Bill Andreycak; 10–269 –10–279, 1995.

Draft International Standard Project De Norme Internationale; Project No. 77A.1.9, Jan. 1993, pp. 1,1a,3,5,7,9,11,13, 15,17,19,21,23,25,27,29,31,33,35,37,39,41,43,45.

Power Factor Corrected Rectifying Circuit; Feb. 9, 1993; 22 pages plus 9 pages of drawings, now U.S. patent No. 5,532,917 issued Jul. 2, 1996, Hurg.

*Primary Examiner*—Richard T. Elms
*Attorney, Agent, or Firm*—Haynes and Boone L.L.P.

[57] ABSTRACT

A line harmonics reduction module is enclosed in a chassis having a receptacle and a plug on opposite faces, for connection externally to a computer system unit or similar electronic equipment between the AC line power cord and the AC power receptacle contained in the computer system unit. The module may contain passive components such as an inductor, or may contain active circuitry designed to reduce the amplitudes of current components at harmonics of the line frequency by forcing the current waveform to be more nearly sinusoidal.

15 Claims, 4 Drawing Sheets

EXTERNAL LINE HARMONICS REDUCTION MODULE FOR POWER SUPPLIES

This is a continuation of application Ser. No. 08/549,040 filed on Oct. 27, 1995, now abandoned.

BACKGROUND OF THE INVENTION

The present invention relates generally to power factor correction and line harmonics reduction circuitry in relation to switching power supplies used in electronic devices such as personal computers and, more particularly, to the packaging of such circuitry within an external module rather than inside the power supply or computer equipment itself.

The type of power factor correction circuitry which may be used within an external power supply module of an electronic device such as a computer may include any of a number of known circuits, depending upon the power rating of the power supply unit to be used in the computer or other electronic device. Newly drafted international standards, i.e., the International Electrotechnical Commission (IEC) Draft International Standard EN61000-3-2 (the "draft standard"), require the limitation of line harmonic content of the current supplied to various types of alternating current (AC) powered equipment, including personal computers employing switching power supplies.

Many switching power supplies employ a rectifier bridge followed by a capacitor-input filter, to produce unregulated direct current (DC) power from the line, after which the switching regulator circuit produces various regulated DC voltages at suitable currents for operating the computer motherboard and peripherals. This type of switching power supply, in common with similar linear regulated supplies, draws current from the AC line in short pulses, as the large reservoir capacitor typically used only draws charging current near the peaks of the AC voltage supplied to the rectifier, so that the AC current drawn by the power supply unit is highly non-sinusoidal in form. This results in a high proportion of harmonics of the main frequency appearing in the current waveform. The predominant harmonics are of odd order, such as third, fifth, seventh, etc., although some even order harmonics may also be present. These harmonic current components are at frequencies that are integer multiples of the AC line frequency. These harmonics do not contribute to the power drawn from the AC supply but do increase the RMS current drawn from it. The apparent power drawn is higher than the actual or true power that is used and converted into DC power. Consequently, the power factor (which is the ratio of true power to apparent power) is reduced. The new standards define the minimum acceptable power factor of such power supplies, as related to the proportions of harmonics that are acceptable in these types of equipment. Although the new standards apply to a wide range of equipment, the specific area of concern is equipment containing switching power supplies, such as personal computers.

Since different countries employ different AC power voltages and frequencies, thereby causing differences in the current drawn by power supply units of the same rated wattage, the active or passive components and circuitry required to provide the power factor correction may be significantly different in these countries. Furthermore, there are several power supply ratings, each of which requires different power factor correction circuit components. Country-specific circuitry for power factor correction is therefore required for power supplies to be used in different countries, thereby adding the complexity and cost of manufacturing and distributing computers or other electronic devices worldwide that employ these power supplies.

Therefore, what is needed is an improved system and method for power factor correction and harmonic reduction in a power supply for an electronic device, such as a computer, that is modularized to easily tailor the power supply to country-specific requirements for compliance with international standards, where applicable.

SUMMARY OF THE INVENTION

The present invention, accordingly, provides a system and method for reduction of harmonic content of AC line current to switching power supplies typically used in electronic devices, such as computers, that comprises a module external to the computer for connection between a power cord and a receptacle on the computer to reduce harmonics, either by passive filtering or by active power factor correction circuitry, or by both in combination. Similar modules containing different circuitry are adapted to the specific AC voltage and current in each particular country where such modules may be required. In each such module only those components necessary to the adequate reduction of harmonics for power supply units of each specific power rating is provided. The modules may be furnished separately from the power supply or separately from the computer itself for the purpose of upgrading an existing computer to comply with international standards.

Provision of an external power factor correction module has several advantages over incorporation of the necessary circuitry within the computer system itself. Specifically, since different countries employ different AC power voltages and frequencies, the modular system and method provides flexibility in adapting a power supply to the power factor correction requirements of different countries. This allows the power supply itself to be the same, thereby improving the efficiency of manufacture of the power supply and resulting in lower cost to be incurred by the equipment purchaser. The modules themselves are inexpensive, easy to install, and safe in use.

DESCRIPTION OF THE PREFERRED EMBODIMENTS

Figure 1:
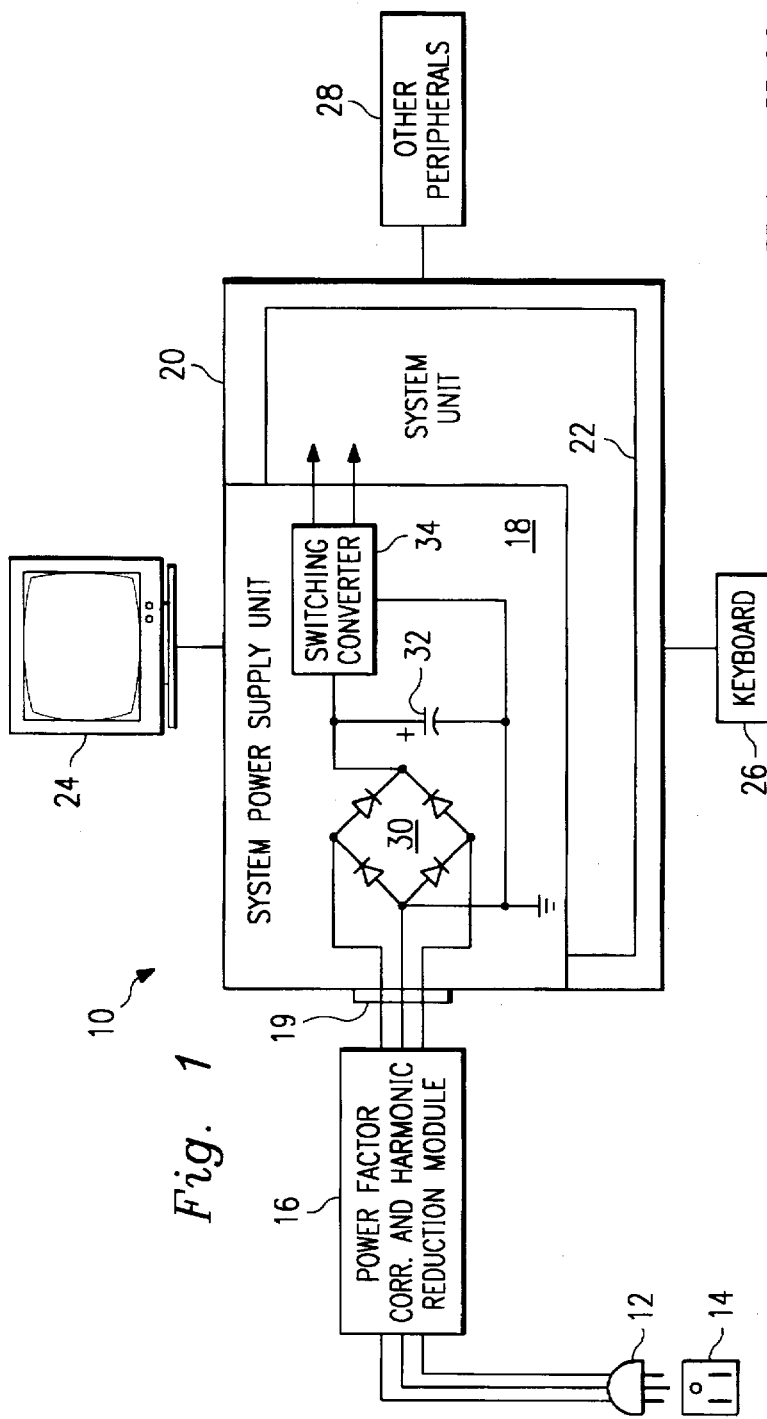
FIG. 1 is a block schematic of a computer system employing an external power factor correction and harmonic reduction module of the invention.

Referring to FIG. 1, the reference numeral 10 refers, in general, to an electronic equipment system incorporating the present invention. An AC power cord 12 is plugged into an electrical outlet 14 to receive power, which is applied through an external power factor correction and harmonic reduction module 16 of the invention to a power supply unit 18 that forms part of a electronic system unit 20, typically a personal computer. The unit 20 contains a motherboard 22 and is in turn typically connected to a monitor 24, a keyboard 26, and other peripherals 28 that require power from the power supply unit 18.

The power supply unit 18 is incorporated physically and electrically within the system unit 20 in a conventional manner. An AC receptacle 19 provides an electrical interface between the power supply unit 18 and the module 16, such that the module 16 may be plugged into the unit 20 via the receptacle 19, as described further below. Within the power supply unit 18 is a typical bridge rectifier 30, a reservoir capacitor 32 and a switching converter 34. This converter typically produces +5V DC power, and other voltages, to the motherboard 22. The specific circuitry of the switching converter 34 is not relevant to the present invention, and is therefore not shown.

It should be understood that in some types of units 20 incorporating linear power supplies, a transformer (not shown) may be connected ahead of the bridge rectifier 30, but this will make little or no difference to the manner in which harmonic currents are generated, described below. However, when a transformer is used, it may place some constraints on the type of power factor correction circuitry that can be incorporated into the module 16.

The power supplied by an electric utility (not shown) comprises a nominally sinusoidal AC voltage usually at a frequency of 50 Hz or 60 Hz, and at voltages ranging from 100V to 230V and above. This power is distributed at high voltages and transformed locally to the nominal supply voltage near the point of use. The power losses in this process of transmission of electric power to the end user are critically dependent upon the power factor of the load. The power lines have some resistance, even though high conductivity materials such as copper and aluminum are used. The power lost in these lines is this resistance times the square of the RMS current. Transformers are used to step up the voltage before transmission, which reduces the current by an equal factor, thereby reducing power losses. However, since the power lost is proportional to the square of the current, it is highly desirable to keep the power factor as close to 1 as possible.

In the past, when electronic equipment was not a significant portion of the total load imposed upon a power system, the principal types of equipment affecting the power factor were the parallel or shunt inductances of transformers and electric motors. In such equipment, the current drawn (I) is effectively sinusoidal but lags the applied voltage V by a small phase angle, $\phi$, and the power factor (P.F.) is then defined as the cosine of that phase angle, i.e., cos $\phi$. The consequence of this is that the power factor, defined by the equation: P.F.=True power/apparent power=Power P (W)/ (voltage V (V)×current I (A))=cos $\phi$. This yields the following equation for the true power P: P=Apparent power (VA)×cos $\phi$=V I cos $\phi$.

Typical inductive loads have power factors ranging from about 0.8 to 0.99. A transformer designed to carry 1500 W of power may have a magnetizing current of about 1 A at 60 Hz, 120V RMS, for example, in which case the power factor is 0.987 or 98.7%, but may be worse when the transformer is supplying much less than its rated power output. Power factor correction for this type of load is fairly simple, as the amount of quadrature phase current flowing due to the inductive character of the load can be counterbalanced by an opposite quadrature phase current flowing through a capacitor connected in parallel with the load.

Figure 2:
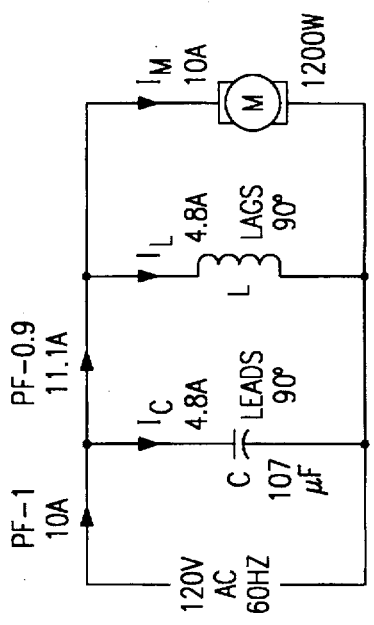
FIG. 2 is a schematic diagram illustrating a method for correcting the power factor of inductive electrical loads such as a motor.

For example, as shown in FIG. 2, a 1200 W motor M operating at 120V would be expected to draw 10 A, but in reality with a power factor of 0.9 it would draw 11.1 A. Since the heating effect of this current in the wiring from the power generation plant to the motor M is proportional to the square of this current, this loss is 1.23 times higher than if the motor power factor was corrected to unity. The lagging quadrature current $I_L$ flowing in the shunt inductance L associated with the motor can be easily calculated and is about 4.8 A. The capacitive impedance which will pass this current is 24.8 ohms, and if the AC power supply frequency is 60 Hz, the capacitor value having this impedance is 107 µF.

After power factor correction by placing a capacitor C of 107 µF in parallel with the motor M and its shunt inductance L, a leading capacitive current $I_C$ of 4.8 A flows, exactly canceling the 4.8 A lagging current $_LI$ flowing through the shunt inductance L. The current drawn from the power source is therefore reduced by this means from 11.1 A to 10 A, restoring the power factor to unity. Adding a capacitor of 100 µF across the motor would correct the power factor to 99.95%, which would be acceptable.

In the case of a power supply unit similar to that shown in FIG. 1, but where a transformer (not shown) precedes the rectifier 22, or where an inductive input filter is used (not shown), a parallel capacitor may be needed to correct the power factor attributable to the inductance in the load. But a greater power factor reduction is caused by the nonlinear nature of the rectifier circuitry in modern switching power supplies.

In more detail, the apparent power is the product of the RMS voltage with the RMS current, while the true power is the integral of the product of instantaneous voltage and current over a cycle, divided by the period of the AC voltage. The current waveform may be represented by a Fourier series, which is the summation over all integer multiples of the fundamental frequency of the amplitude of each harmonic component of the current. As is well known in the electric power art, the integral of a fundamental harmonic with any other harmonic over one fundamental period is zero, since the harmonics form an orthogonal basis set. Thus the true power is the integral of the fundamental current harmonic product with the sinusoidal AC voltage over a cycle, divided by the period.

By contrast, the harmonics of the current waveform do contribute to the RMS current, since this current is simply the integral of the instantaneous current over a cycle divided by the period. More particularly, the RMS current amplitude is equal to the square root of the sum of the squares of the amplitudes of each harmonic, and is always greater than the fundamental harmonic amplitude if the current waveform includes higher harmonics.

Because electronic equipment has become a significant part of the electricity utility's load, the power factor of such equipment is increasingly of concern to power suppliers, and therefore there has been pressure on regulatory authorities to develop minimum standards for power factor and harmonic content of the AC current drawn by such equipment.

Figure 3:
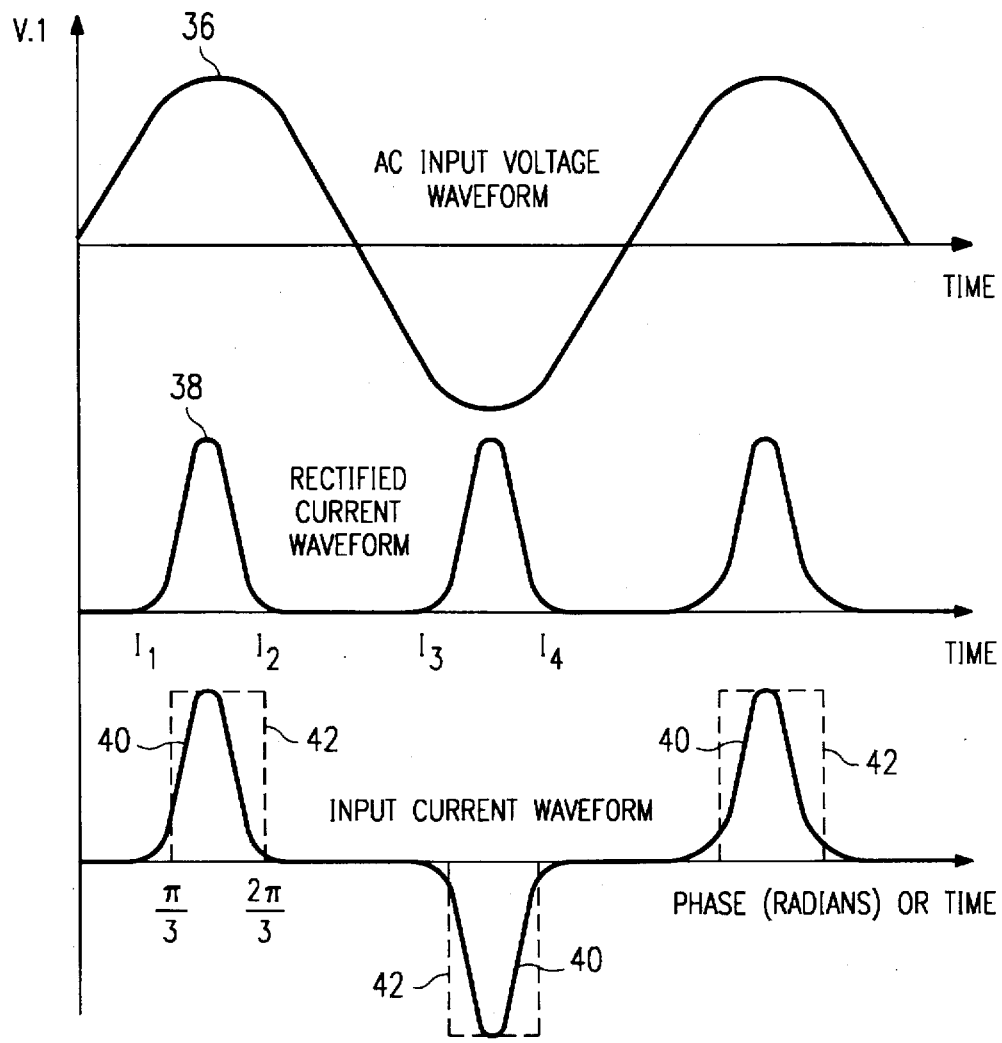
FIG. 3 shows current and voltage waveforms typically occurring in the circuitry of FIG. 1, and an envelope which requires power factor correction circuitry.

In the circuitry of the typical bridge rectifier 30 and following capacitor 32 of FIG. 1, the poor power factor, typically in the range of 0.6 to 0.7, arises in the following manner, illustrated by the waveforms shown in FIG. 3. As an AC input voltage waveform 36 nears its positive peak value, at time $t_1$, two of the four diodes in the rectifier 30 conduct, passing current into the capacitor 32 to charge it according to a rectified current waveform 38. After the voltage peak is reached, at time $t_2$, the voltage applied to the diodes of the rectifier 30 decreases and the current flow into the capacitor 32 stops. Thus the current flowing into the capacitor 24 occurs only in a short period, considerably less than a half-cycle of the AC input voltage sinusoid. Similarly, when the AC voltage reverses polarity and nears its negative peak value at time $t_3$, the other two diodes of rectifier 30 conduct and pass a similar current pulse into the capacitor 32, which terminates at time $t_4$.

The voltage waveform 38 applied to the bridge rectifier 30 of FIG. 1 is often somewhat distorted by the high peak currents drawn by the capacitor 32, which delivers almost constant DC current to the load. More significantly, the current waveform 38 is spiky and of much higher amplitude than the sinusoidal current waveform that would draw the same power from the AC line. Thus the problem of power factor correction in this case is a problem of waveform correction, so as to restore the input AC current waveform to a more nearly sinusoidal shape.

An input current waveform 40 follows the polarity of the AC input voltage waveform 36 but has the same shape in each half-cycle as the rectified input current waveform 36. Shown in broken outline is an envelope waveform 42 defined in the previously referenced IEC draft standard in reference to "class D" equipment, including information technology equipment such as computer systems. The waveform in each half cycle has transitions from zero to its maximum at phase $\pi/3$ and from maximum to zero at $2\pi/3$. If the current waveform falls within this envelope for at least 95% of the time, this equipment must incorporate power factor correction circuitry to comply with the standard. After correction, the harmonic amplitudes must not exceed the specified limits as a proportion of the rated power and also must not exceed absolute limits tabulated in the standard.

Figure 4:
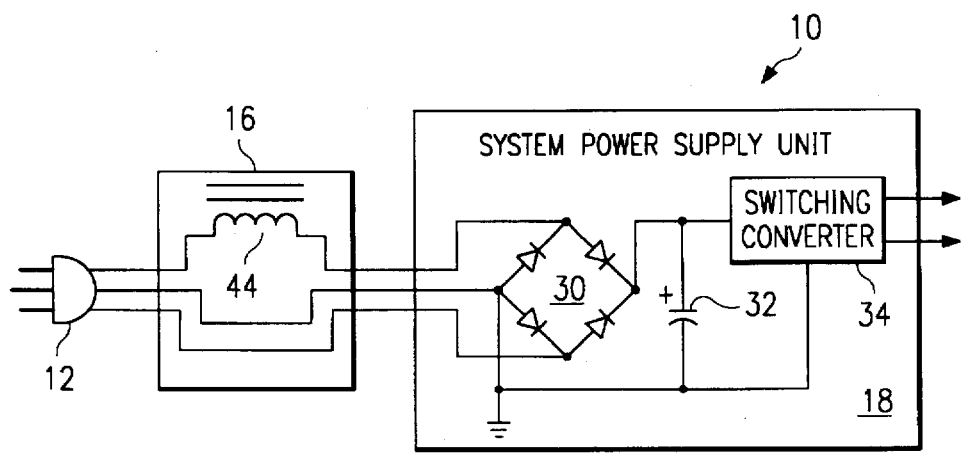
FIG. 4 shows passive filter circuitry which may be incorporated within the external filter module of the invention.

Two methods exist to correct this type of problem. In the first method, shown in FIG. 4, AC power received through the power cord 12 passes through an inductor 44, housed in the external harmonics reduction module 16, which is placed in series with the rectifier 30, capacitor 32 and switching circuitry 34 of the system power unit 18. The impedance of an inductor increases linearly with frequency, and therefore an inductor has three times the impedance at the third harmonic of the AC line frequency that it has at the fundamental. Consequently, the third, fifth and higher harmonic currents are reduced, improving the power factor.

A disadvantage of this method is that it also reduces the available voltage to the bridge rectifier 30 and makes the design of the switching power supply 18 more critical with regard to variations in the AC supply voltage. However, the inductor 44 is relatively inexpensive.

An inductor 44 suitable for one country with AC power supplied at 230V, 50 Hz, is likely to be significantly different from one serving the same purpose and reducing harmonics content of the current drawn by a similarly rated system power supply unit by the same amount, but for a country having AC power of 100V at 60 Hz. Because of this, there is a strong advantage in having the inductor 44 in a separate module external to the computer system, so that the system power supply shipped in all system units 20 can be the same type and rating regardless of where it is to be operated. System power supply units 18 usually are manually or in some cases automatically switched between 90V–132V and 180V–270V operating voltage ranges and are tolerant of frequencies from 47 Hz to 63 Hz.

In addition, the size of the inductor 44 required to make a significant reduction in harmonic content increases as the rated output of the power supply increases, and is typically much larger than inductors used for suppression of high frequency switching noise. In typical computer power supplies such as the unit 18, there is not enough available space to install an inductor 44 of the required size inside the unit, and therefore this invention provides for the required inductor to be enclosed in the external module 16.

Furthermore, although such large inductors 44 are not very expensive, solutions which require much smaller inductors in conjunction with inexpensive active integrated circuits can be attractive alternatives. In addition, the inductor 44 presents an inductive reactance to the AC supply, which may need to be compensated by adding a small AC-rated parallel capacitor. This approach can also be used if the power supply circuit includes a transformer (not shown) before the bridge rectifier 30, which is not usually true of computer power supply units.

For power supply units having a higher wattage rating, the new requirements set by the above-referenced International Electrotechnical Commission (IEC) Draft International Standard EN61000-3-2 (the "draft standard") are more stringent. Below 75 W, no harmonic reduction is necessary, although this limit will be reduced to 50 W later. Power supplies in the 200 W range are allowed 3.4 mA/W or 680 mA of third harmonic current. Since the fundamental current at 230V would be 870 mA, this amount of third harmonic content would be 78% of the fundamental or about 61% of the total RMS current. The maximum allowed current is 2.30 A at third harmonic. Corresponding numbers for the fifth harmonic are 1.9 mA/W or 380 mA with an upper limit of 1.14 A, i.e. about 43% of the fundamental. With third and fifth harmonics at the maximum allowable levels according to these limits, the power factor (not including higher harmonics) would still only be 75%. Including the maximum allowed amplitudes for the harmonics up to the 21st, the power factor would be 73% or 0.73 after correction. This represents a substantial improvement over the usual power factor of about 0.6.

The upper absolute current limiting values specified in the draft standard represent about a 940 W power supply input rating for the odd harmonics. Beyond this level, the power supply must have still lower proportions of the upper harmonics in its input current.

In order to achieve better performance, active power factor correction circuitry is now available. A typical such circuit switches power at a high rate into a reservoir capacitor, using a boost converter, and controlling the average current so that it is constrained to be sinusoidal and in-phase with the voltage. Although this method produces high frequency components, these may be much more easily filtered than the low frequency harmonics of the AC mains frequency.

Figure 5:
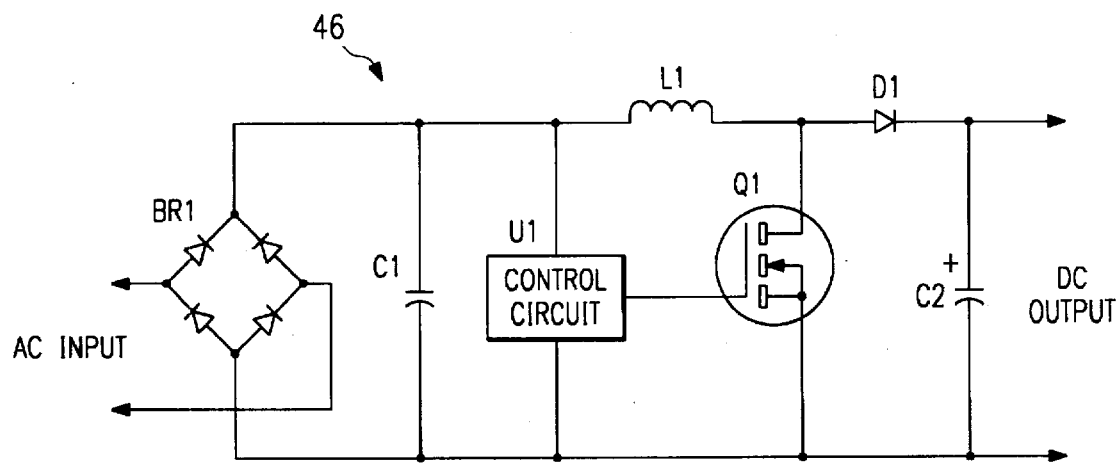
FIG. 5 shows active power factor correction circuitry which may be incorporated within the external power factor correction module of the invention.

Referring to FIG. 5, a typical example of such a circuit 46 is included. In the prior art, the circuit 46 forms part of the rectifier circuitry internal to the power supply unit 18, but this adds cost to the power supply unit, and requires a different design for each specific voltage, frequency and power rating. Therefore, it is advantageous to make the power factor correction (PFC) circuit 46 an external module, a different module being required for each voltage, frequency and power rating, while the same internal power supply unit 18 is used for all system units 20 of a given power rating.

In the circuit 46, AC power is first rectified by a bridge rectifier BR1 with a small reservoir capacitor C1 which is primarily for reduction of high-frequency switching ripple. The power factor correction circuit 46 elements comprise a series inductor L1, a switching element Q1, a diode D1 and a capacitor C2, which is the reservoir capacitor for the power supply unit. In addition, there is a control circuit U1, usually an integrated circuit power controller designed for such applications, such as the Unitrode UC 3852.

This type of system using IC's such as the Unitrode UC3852 operates in discontinuous mode, with a variable frequency for the high-frequency switching waveform. The rapid switching on and off of the element Q1 alternately increases and decreases the current through the inductor L1 so that its average current is approximately sinusoidal, by varying the switching frequency and duty cycle. The control circuit U1 also regulates the amount of this current so as to control the DC voltage output of the power supply unit 18.

The circuit 46 is in the external module 16, so that the DC output therefrom would then directly drive the bridge rectifier 30 inside the power supply unit 18, which would simply pass through the DC voltage so obtained. The power factor can be improved to 0.997 by this means. The reservoir capacitor C2 need not be very large in this case, since it is supplemented by the large capacitor 32 in the power supply unit 18.

Because the circuit 46 produces and uses high switching frequencies, it must be well shielded and filtered to prevent radiation of the switching frequency and its harmonics or conduction of such signals into the AC power supply unit 18. Placing the module 16 directly at the input to the computer system unit 20 minimizes the length of wiring that could act as an antenna to radiate this electrical noise, and the wiring concerned is already shielded by the case of the computer system unit 20.

In contrast, placing the module 16 at the far end of the power cord 12 (i.e. at the wall outlet) would be unsatisfactory as it would require additional shielding and isolation of the switching frequencies from the power cord 12 to the unit 20. The power cord 12 itself would require shielding.

Therefore, the best position for the external power factor correction module 16 is directly attached to the back of the computer system unit 20, connected to the power supply unit 18's input receptacle.

Figure 6A:
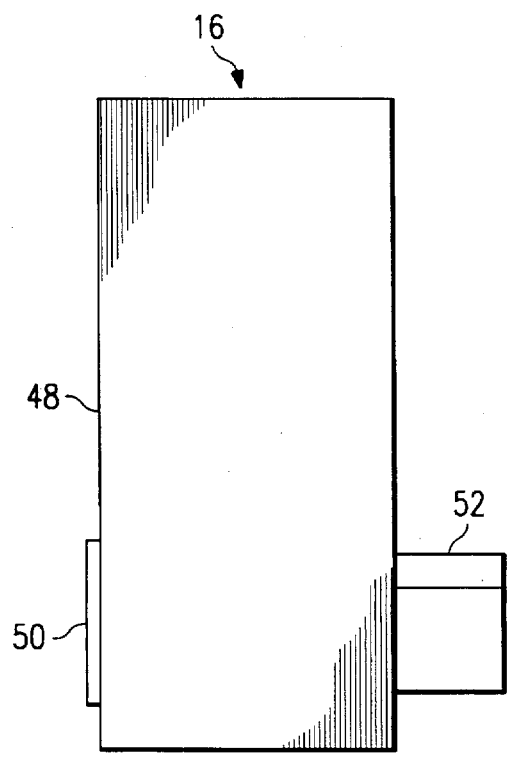
FIGS. 6a and 6b show a side and a front view, respectively, of the external power factor correction module of the invention for use with a computer system.
Figure 6B:
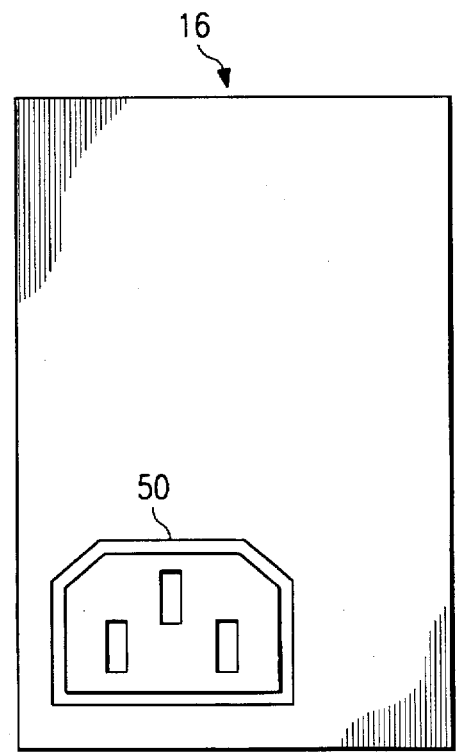

In FIGS. 6a and 6b, a drawing of the physical construction of the external power factor correction and harmonic reduction module 16 is shown. The circuit of FIG. 4, or alternatively the circuit 46 of FIG. 5, is contained within a chassis 48 of the module 16. On one surface of the chassis 48 there is provided a receptacle 50 for the power cord, and on the opposite surface there is a plug 52 for connection to the computer unit 20. Approximate dimensions may be in the range of 40 mm by 60 mm by 70 mm.

Figure 7:
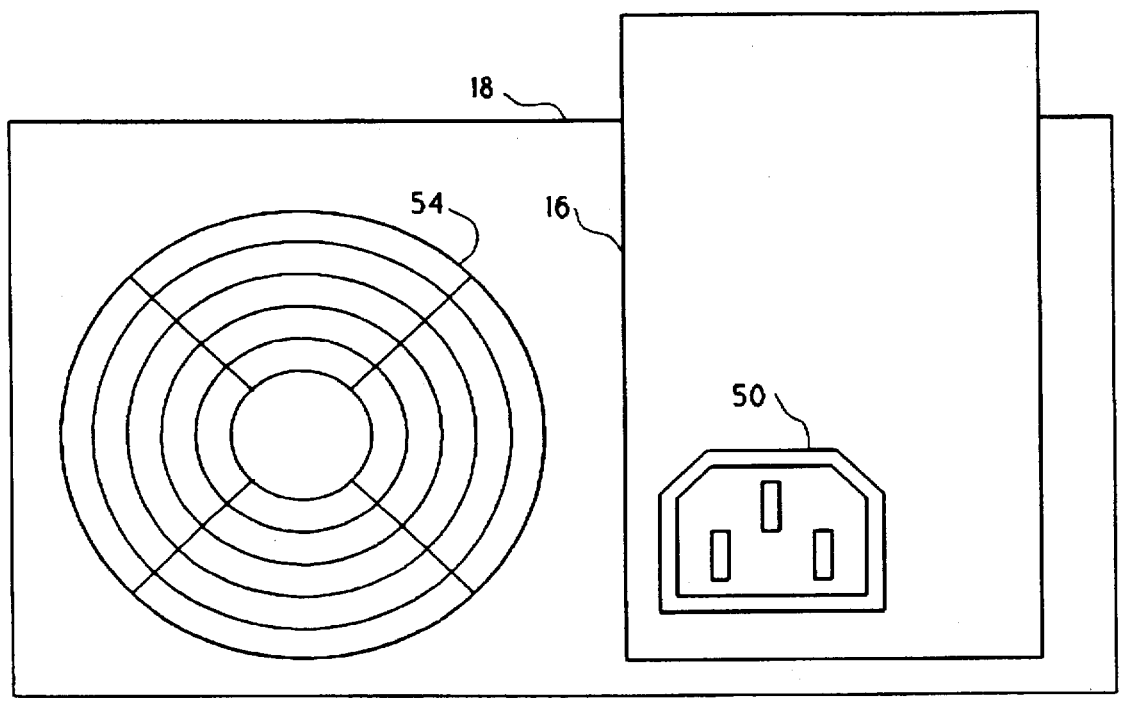
FIG. 7 is an enlarged view of the external power factor correction module of the invention illustrating the typical location of the module relative to the computer system power supply and its cooling fan.

As shown in FIG. 7, the size and shape of the external line harmonics reduction module 16 is designed to avoid obstruction of a fan 54 mounted in the system power supply unit 18. It is small enough not to interfere with the keyboard connector (not shown), although the monitor power connector (not shown) may be covered in some systems. The module 16 houses either an inductor or an active power factor correction circuit 46 as described previously.

Several advantages result from the present invention. For example, one advantage of the module 16 is that the circuitry 46 or inductor contained therein required to meet proposed international standards differs from country to country, and the module's internal circuitry may be so designed as to comply with the standards relevant to each country, while employing the identical power supply unit 18 in the computer system unit 20. Additionally, the circuitry 46 may be varied according to the rated power of the system unit 20.

The module 16 is placed at the most favorable location for prevention of radiated or conducted electromagnetic interference from the internal components and wiring of the module circuitry and from the computer system unit 20. In an alternative embodiment, the power cord 12 and the module 16 are integrated and sold as a separate unit.

While the circuitry and mechanical construction shown herein is illustrative of the general nature of the invention, the invention is not limited to the embodiments shown herein, and numerous modifications and adaptations within the scope of the invention will be apparent to those skilled in the art.

What is claimed is:

1. An electronic equipment system supplied from an AC power source line comprising:

a system unit including a switching power supply having an AC power receptacle, a rectifier, a capacitor and switching circuitry;

a line harmonics reduction module connected externally of said system unit and directly to said AC power receptacle via a plug mounted on an external wall of said module, said module comprising a circuit including an inductor, the module being in series with the rectifier, capacitor and switching circuitry of the power supply and adapted to improve the power factor of said system unit by reducing the amplitudes of current components at harmonics of said power source line frequency; and an AC power cord connectable between said AC power source line and said module for providing AC power to said system unit through said AC power receptacle via said module.

2. The electronic equipment system of claim 1 wherein said module circuit is designed for the particular AC supply voltage and frequency characteristics of said AC power source line while said switching power supply is the same regardless of the particular AC supply voltage and frequency characteristics of said AC power source line.

3. The electronic equipment system of claim 1 wherein said module circuit comprises a passive circuit for reducing the harmonic content of the AC current drawn by said system unit.

4. The electronic equipment system of claim 1 wherein said module circuit comprises an active power factor correction circuit for reducing the harmonic content of the AC current drawn by said system unit.

5. The electronic equipment system of claim 1 wherein said line harmonics reduction module is optimally placed to minimize conducted and radiated electromagnetic interference by being directly plugged into said power supply.

6. The electronic equipment system of claim 1 wherein said line harmonics reduction module comprises a chassis that is shielded to reduce electromagnetic radiation therefrom.

7. The electronic equipment system of claim 1 wherein said module and said power cord are integrated as a single unit.

8. The electronic equipment system of claim 1 wherein said module comprises a chassis including an AC power input receptacle and an AC power output plug for connection between said AC power cord and said AC power line receptacle, respectively, said module circuit being electrically connected between said input receptacle and said output plug, said circuit further including means for rectifying AC power, a first capacitor for reduction of high frequency switching ripple, a switching element, a diode, a second reservoir capacitor for the power supply, and a control circuit operating in discontinuous mode with a variable frequency.

9. A power adaptor kit for use with an electronic equipment system supplied from an AC power source line, the system including a system unit including a switching power supply having an AC power receptacle, the kit comprising:

at least one line harmonics reduction module each connectable externally of said system unit and directly to said AC power cord via a plug mounted on an external wall of said module, each said at least one module including a circuit adapted to improve the power factor of said system unit by reducing the amplitudes of current components at harmonics of said power source line frequency;

an AC power cord connectable between said AC power service line and a selected one of said at least one module for providing AC power to said system unit through said AC power receptacle via said selected module;

such that said module circuit of each of said at least one module is designed for improving the power factor of said system unit for different AC supply voltage and frequency characteristics of said AC power source line; and said circuit including a bridge rectifier with a first reservoir capacitor for the reduction of high frequency switching ripple, a series inductor, a switching element for alternately increasing and decreasing current through the inductor, a diode, a second reservoir capacitor for the power supply and a control circuit regulating the current to control DC voltage out-put of the power supply.

10. The kit of claim 9 wherein said at least one module comprises a chassis including an AC power input receptacle and an AC power output plug for connection between said AC power cord and said AC power line receptacle, respectively, said module circuit electrically connected between said input receptacle and said output plug.

11. The kit of claim 9 wherein said module is directly plugged into said power supply such that it minimizes conducted and radiated electromagnetic interference.

12. The kit of claim 9 wherein said module comprises a chassis that is shielded to reduce electromagnetic radiation therefrom.

13. Apparatus for providing power to an electronic equipment system supplied from an AC power source line, the system including a system unit having a switching power supply with an AC power receptacle, the apparatus comprising:

at least one line harmonics reduction module each for connection externally of said system unit and directly to said AC power receptacle via a plug mounted on an external wall of said module, each said at least one module including a circuit adapted to improve the power factor of said system unit by reducing the amplitudes of current components at harmonics of said power source line frequency;

an AC power cord connectable between said AC power source line and a selected one of said at least one module for providing AC power to said system unit through said AC power receptacle via said selected module;

wherein said module circuit of each of said at least one module is optimized for different AC input voltages and frequencies of said power supply line; and said circuit including a bridge rectifier with a first reservoir capacitor for reduction of high frequency switching ripple, a series inductor, a switching element for alternately increasing and decreasing current through the inductor, a diode, a second reservoir capacitor for the power supply and a control circuit regulating the current to control DC voltage output of the power supply.

14. A method for reducing harmonics in AC power supplied from an AC power source line to an electronic equipment system, the electronic equipment system including a system unit having a switching power supply with an AC power receptacle, the method comprising:

connecting a line harmonics module externally of said system unit and directly to said AC power receptacle via a plug mounted on an outer surface of said module, said module including a circuit adapted to improve the power factor of said system unit by reducing the amplitudes of current components at harmonics of said power source line frequency;

connecting an AC power cord between said AC power source line and said at least one module for providing AC power to said system unit through said AC power receptacle via said module; and providing, in the circuit, a bridge rectifier with a first reservoir capacitor for reduction of high frequency switching ripple, a series inductor, a switching element for alternately increasing and decreasing current through the inductor, a diode, a second reservoir capacitor for the power supply and a control circuit regulating the current to control DC voltage output of the power supply.

15. The method of claim 14 wherein said step of connecting said AC power cord further comprises:

inserting a plug disposed at one end of said AC power cord into a receptacle electrically connected to said power supply line; and inserting a plug disposed at the other end of said AC power cord into a receptacle disposed on said outer surface of said module and electrically connected to said module circuit.

* * * * *